United States Patent [19]

Komachiya et al.

[11] Patent Number: 5,745,611
[45] Date of Patent: Apr. 28, 1998

[54] OPTICAL FIBER PRESSURE SENSOR

[75] Inventors: Masahiro Komachiya, Hitachi; Shigeru Oho, Hitachinaka; Satoshi Shimada, Hitachi; Takayuki Fumino; Tatsunori Sakaguchi, both of Hitachinaka; Takao Sasayama, Hitachi, all of Japan

[73] Assignee: Hitachi, Ltd., Tokyo, Japan

[21] Appl. No.: 725,819

[22] Filed: Oct. 7, 1996

[30] Foreign Application Priority Data

Oct. 6, 1995 [JP] Japan .................. 7-259740

[51] Int. Cl.[6] ............................ G02B 6/125
[52] U.S. Cl. ............ 385/13; 385/128; 250/227.14; 250/227.18
[58] Field of Search ................ 385/13, 12, 128, 385/127; 250/227.14, 227.18

[56] References Cited

U.S. PATENT DOCUMENTS

| | | | |
|---|---|---|---|
| 4,822,135 | 4/1989 | Seaver | 385/13 |
| 5,218,419 | 6/1993 | Lipson et al. | 356/345 |
| 5,260,566 | 11/1993 | Reed | 385/12 |
| 5,633,494 | 5/1997 | Danisch | 385/13 |

FOREIGN PATENT DOCUMENTS 60-166739  8/1985  Japan.

Primary Examiner—Rodney B. Bovernick
Assistant Examiner—Ellen E. Kang
Attorney, Agent, or Firm—Evenson, McKeown, Edwards & Lenahan, P.L.L.C.

[57] ABSTRACT

An optical fiber pressure sensor for measuring a pressure on the basis of an optical power loss depending on a configuration change of an optical fiber comprising a luminescence device optically connected with at least an optical fiber which is constructed with a main part for propagating a light protective coating member for protecting the main part. A light intercepting device detects a light passing through the optical reflected light from the optical fiber. A bending device bends at least a part of the optical fiber according to a measured pressure. The optical fiber pressure sensor is characterized by being used when a normalization frequency V value of the optical fiber is smaller than 90% of a normalization cut-off frequency defining a single transmission mode condition of the optical fiber.

16 Claims, 15 Drawing Sheets

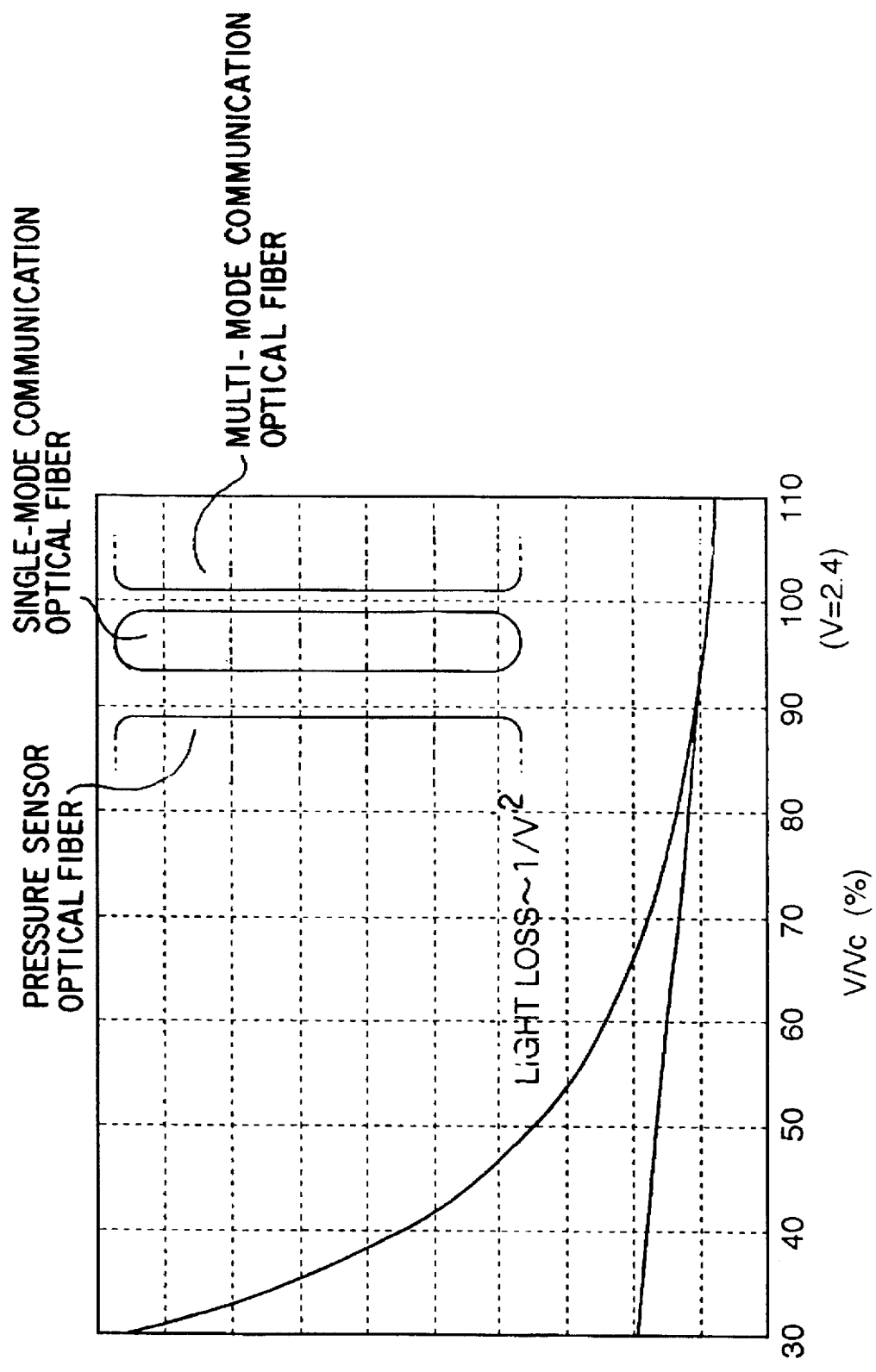

CROSS-SECTIONAL DIAMETER OF OPTICAL FIBER

OPTICAL FIBER PRESSURE SENSOR

BACKGROUND OF THE INVENTION

The present invention relates to not only measurement and control of combustion pressure in a vehicle engine, but to the overall industrial fields where pressure is measured and used for control.

Although the present invention can be applied to pressure measurement and control in general, the prior art will be described below with respect to a combustion pressure sensor for vehicle engine control as an example.

The main technology for combustion pressure measurement has been the electrical pressure detection utilizing piezoelectromotive force or piezo-resistance effect. On the other hand, there is proposed an optical sensor, particularly a combustion pressure sensor, utilizing an optical fiber which guards against electrical noise and is easy to mount around an engine having a complex construction. Such a controller is disclosed, for example, in Japanese Patent Application Laid-Open No. 60-166739, where optical fibers are arranged around an engine and some of the optical fibers are passed through pressure detection cases provided in washer positions for a bolt. Since the optical fiber is made of an electrical insulator, the optical fiber can be drawn through gaps around the engine without much danger of a short circuit occuring. In addition to the above sensor, there is a combustion pressure sensor of another type in which an optical fiber is mounted inside an engine together with a pressure detecting portion. FIG. 13 shows the construction of the combustion pressure sensor. In the combustion pressure sensor of FIG. 13, most of the optical fibers are mounted inside the engine head gaskets together with the pressure detecting portions provided in the individual cylinders. In this case, since there is no need to provide holes for mounting the sensor to the main body of the engine, a plurality of pressure detecting portions can be easily mounted on the engine and there is little possibility of a disconnection occuring during the mounting or operating of the sensors. In each of the pressure receiving portions, the optical fiber suffers bending deformation corresponding to the inner pressure. Since an amount of light transmitted through the optical fiber is varied by the optical power loss induced by the bending deformation, the change in the inner pressure can be reversely detected from the change in the amount of transmitted light. In general, it is difficult to provide enough mounting space for a plurality of sensors necessary for multicylinder pressure measurement, but the design of FIG. 13 can solve this problem.

Various kinds of optical fibers can be used for the optical fiber pressure sensors described above. On the other hand, known common optical fibers are widely used for long-distance light transmission and as such are designed so as to have a small optical power loss due to bending deformation. In this case, a necessary sensor sensitivity to the bending, that is, a necessary change in the light intensity, can be obtained, for example, by providing plural bending deformation positions for an optical fiber. However, in the case of providing plural bending deformation positions for an optical fiber, the length of the optical fiber suffering the deformation becomes long. Therefore, the means necessary for applying the bending deformation cannot help to have a larger construction compared to a means having a single position suffering small bending deformation. That is, an optical fiber having a known common construction can easily be found, but there is a disadvantage in that it is difficult to make such a fiber small enough in size for the bending means to apply bending deformation while maintaining sufficient detecting sensitivity. This is not only disadvantageous with respect to mounting, but includes an essential problem in that with a pressure receiving portion having a large construction, it is difficult to attain a high frequency response. The combustion pressure measurement of an engine requires response capability of, for example, approximately 20 kHz for detecting abnormal combustion.

SUMMARY OF THE INVENTION

An object of the present invention is to solve the above problem.

The object of the present invention can be attained by providing an optical fiber pressure sensor having at least one optical fiber composed of a main portion for transmitting light and a protective coating for protecting the main portion, a light generating means optically connected to the optical fiber, a light receiving means for detecting transmitted light or returned reflected light in the optical fiber, a means for applying bending corresponding to a pressure to be measured to at least a portion of the optical fiber, the pressure being measured by optical power loss induced by the change in shape of the optical fiber, which is used under a state that a normalized frequency (V-value) of the optical fiber is set to a value not larger than 90% of a normalized cut-off frequency giving a single mode condition of the optical fiber. In detail, the optical fiber pressure sensor is characterized by constructing the main portion of the optical fiber with a core (a portion in which light is trapped and transmitted) having a nearly uniform refractive index and a cladding (a component which occupies the outer portion of the core), and using an optical fiber in which the normalized frequency (V-value) is set within the range of 1.0 to 2.0 to a given light source. Further, the optical fiber pressure sensor is characterized by setting the specific refractive index difference of the core and the cladding within the range of 0.15% to 0.25%, and setting the cut-off wavelength of the optical fiber within the range of 0.5 μm to 0.7 μm.

The optical fiber pressure sensor is characterized in that the optical fiber designed so as to have a diameter of a main portion of the optical fiber not larger than 125 μm. The main portion of the optical fiber is a portion having the protective coat removed from the optical fiber. At the same time, the optical fiber pressure sensor is characterized by a structure for pre-setting a distortion to the inside of the main portion of the optical fiber, or by a stress modulating layer between the protective coat and the main portion of the optical fiber.

Further, the optical fiber pressure sensor is characterized by a structure in which the means for applying bending is designed so as to push a point of the optical fiber between two points for supporting the optical fiber; i.e. a three-point support bending structure. In addition to this, the optical fiber pressure sensor is characterized in that the initial bend setting of the optical fiber is set milder or tighter than at the middle position of a range wherein the amount of transmitted light through the optical fiber linearly decreases, so that the operating range of the sensor enters into a non-linear response region either in the low pressure side or the high pressure side.

Furthermore, the optical fiber pressure sensor is characterized in that a heat resistant material such as a poly-imide resin or a metallic material is used for the Protective coat of the optical fiber.

BRIEF DESCRIPTION OF THE DRAWINGS

FIG. 15 is an explanatory graph showing the relationship between optical power loss of an optical fiber induced by deformation and V-value.

PREFERRED EMBODIMENTS OF THE INVENTION

Figure 1:
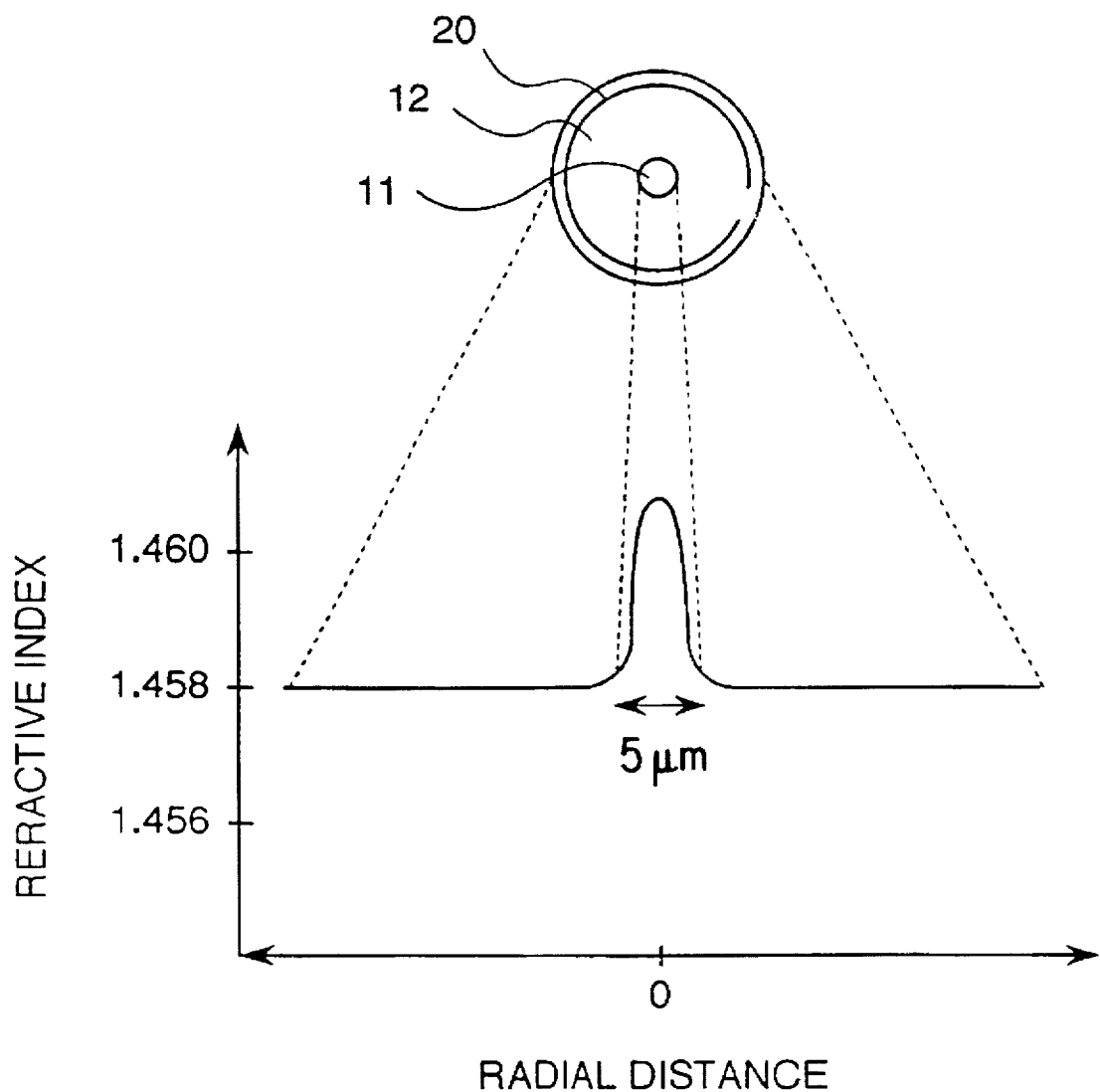
FIG. 1 is a cross-sectional view showing a first embodiment of an optical fiber in accordance with the present invention and an explanatory graph showing its refractive index distribution.

Firstly, a description of the measuring principle of an optical fiber cylinder inner pressure sensor of one embodiment of the present invention will be provided.

In the optical fiber cylinder inner pressure sensor in accordance with the present invention, a normalized frequency (V-value) of the optical fiber is set to a value not larger than 90% of a normalized cut-off frequency giving a single mode condition of the optical fiber in order that the optical fiber can show a substantial change in the amount of transmitted light. This is a design concept opposite to the design of the common communication optical fiber in which an amount of light change induced by the bending deformation is suppressed so as to be as low as possible. However, in order to use the optical fiber for a pressure sensor, the intention of the present invention is to improve the sensitivity of the optical fiber to improve the durability by moderating the bend required of the optical fiber, and to reduce the size of the pressure receiving portion. In detail, the sensitivity of the light intensity change to the bending deformation of the optical fiber pressure sensor is increased without making the inner structure of the optical fiber particularly complex by constructing the main portion of the optical fiber with a core (a portion in which light is trapped and transmitted) having a nearly uniform refractive index and a clad (a component which occupies the outer portion of the core), and using an optical fiber in which the normalized frequency (V-value) is set within the range of 1.0 to 2.0 to a given light source. Further, the optical fiber pressure sensor can be realized using a light source having a wavelength of 0.78 to 0.83 µm, which is comparatively easily obtainable and low in cost, by setting the specific refractive index difference of the core and the clad to within the range of 0.15% to 0.25% and setting the cut-off wavelength of the optical fiber to within the range of 0.5 µm to 0.7 µm.

The durability of the optical fiber is important for using the optical fiber for a long period of time under a state where bending deformation is applied to the optical fiber. In the present invention, the optical fiber is designed so as to have a main portion of the optical fiber with a diameter which is not larger than 125 µm. The main portion of the optical fiber is a portion thereof with the protective coat from the optical fiber removed, and the main portion of a common communication optical fiber has an outer diameter of 125 µm. By doing so, the surface strain to the same bending deformation of the main portion, for example, a quartz glass portion, is reduced. Since a break of an optical fiber is caused by growth of a small flaw on the surface of the main portion of an optical fiber generated by strain during operation, the break is prevented by changing the outer diameter of the main portion to the aforementioned 10 value. When the outer diameter of an optical fiber is reduced, the stiffness of the optical fiber itself is decreased and the optical fiber is apt to twist. As the result of twisting, it is considered that an additional distortion occurs in the main portion of the optical fiber to change the sensitivity to the bending deformation. In the present invention, in order to cope with this sensitivity change, the effect of comparatively small strain due to the twisting is reduced by a structure for pre-setting a distortion for the main portion of the optical fiber. Further, a stress modulating layer is provided between the protective coat and the main portion of the optical fiber so that the effect of the overall twisting of the optical fiber becomes difficult to be transmitted to the main portion.

Further, the optical fiber pressure sensor is designed so as to have a small-sized and better frequency-responsive pressure receiving portion. The sensor has a structure in which the means for applying bending pushes a point of the optical fiber between two points for supporting the optical fiber (threepoint support bending structure). In addition to this, the initial setting bend is set milder than at the middle position of a range where the amount of transmitted light through the optical fiber decreases nearly linearly, so that the sensor responds to a high applied pressure in the linear response region and, on the other hand, responds to a low applied pressure in the strong non-linear response region. In an example of applying the sensor to combustion pressure measurement of each cylinder pressure, using the above structure, an increase in the combustion pressure which is important for engine control can be correctly detected using the linear response region while suppressing the distortion applied to the optical fiber. On the contrary, the initial setting bend is set tighter than at the middle position of a range where the amount of transmitted light through the optical fiber decreases nearly linearly, so that the sensor responds to a low applied pressure in the linear response region and, on the other hand, responds to a high applied pressure in the strong non-linear response region. In an example of applying the sensor to combustion pressure measurement of each cylinder pressure, by the above structure, a small pressure inside the cylinder of nearly minus one atmospheric pressure observed during the fuel and air intake stroke can be correctly measured using the linear response region, and at the same time a combustion pressure of nearly 100 atmospheric pressures can be detected using the non-linear response region by the flattening characteristic (outputting a value smaller than a value in the linear response region). These sensors may be used depending on the measurement purpose.

Since the structure of the pressure receiving portion can be easily made small in size in the optical fiber inner cylinder pressure sensor, the pressure detecting portion including the pressure receiving portion and the optical fiber can be easily mounted inside each of the components composing the engine, that is, inside a basket, a spark plug or a bolt. In such case, by using a heat resistant material such as a poly-imide resin or a metallic material for the protective coat of the optical fiber, thermally stable pressure measurement can be performed.

As described above, in the optical fiber cylinder inner pressure sensor, by changing the shape of the optical fiber itself so as to fit to pressure measurement, the means for applying bending deformation can be made small in size while maintaining a sufficient detecting sensitivity, and at the same time the durability and the responsiveness required for practical use of the optical fiber pressure sensor can be attained.

An embodiment of the present invention will be described below in detail, referring to the accompanied figures.

FIG. 1 shows the construction of a first embodiment of an optical fiber in accordance with the present invention. The fiber is designed so as to fit a pressure detection scheme. The figure is a cross-sectional view of the optical fiber and an explanatory graph showing its refractive index distribution in the diametrical direction. Light is transmitted axially through the optical fiber within a core 11 having a refractive index slightly higher than the refractive index of an optical fiber clad 12. In FIG. 1, the difference in the refractive indexes is exaggerated for easy understanding. The main portion of the 13 optical fiber composed of the core 11 and the clad 12 is protected by a protective coat 20 from flaws and shocks.

The basic construction of an optical fiber is determined by a refractive index distribution shown in FIG. 1. In order to numerically describe the characteristic of an optical fiber when the optical fiber is used using light having a specified wavelength of $\lambda$, a normalized frequency (V-value) given by the following equation (1) is commonly used.

$$V = a n_c \frac{2\pi}{\lambda} \sqrt{2\Delta} \quad (1)$$

V: normalized frequency
a: core radius
$n_c$: refractive index of core
$\Delta$: specific refractive index difference of core and clad
$\lambda$: wavelength of light source $$\Delta = \frac{1}{2}\left(1 - \frac{n_{cl}^2}{n_c^2}\right) \cong \frac{n_c - n_{cl}}{n_c} \quad (2)$$

FIG. 1 shows a quartz glass fiber having a specific refractive index difference $\Delta$ of the core 11 and the clad 12 of 0.17% (value of the refractive index difference between the core and the clad of 0.0025 divided by the refractive index of the core of 1.465), and a core radius "a" of 2.5 μm. When a light source has a central wavelength $\lambda$ of 0.83 μm, the v-value is 1.6. When a light source has a central wavelength $\lambda$ of 0.78 μm, the v-value is 1.7.

The optical fiber of FIG. 1 is a step index type optical fiber having a nearly constant core refractive index and a nearly constant clad refractive index, and it is known that the normalized cut-off frequency giving a single mode condition is nearly 2.4. As the V-value decreases to less than 2.4, light is apt to expand outside the core 11 and apt to leak out of the optical fiber due to deformation of the optical fiber. To the contrary, when the V-value becomes larger than 2.4, not only fundamental mode light but also higher order mode light becomes stably transmitted inside the core. The optical power loss arising by the bending of the optical fiber depends on the half diameter of the core or wave length of the light from the light source etc. In detail, however, the optical characteristics are obtained from the V value in a practical range. In general, in a communication single mode optical fiber, although the V-value is set smaller than 2.4 in order to suppress occurrence of higher mode light, it is essentially necessary to avoid optical power loss due to the deformation of the optical fiber in order to attain stable long-distance light transmission. For this reason, the V-value of communication single mode optical fiber is set to a value slightly smaller than the normalized cut-off frequency, but larger than 90% of the normalized cut-off frequency. For the case of a step index type optical fiber, the V-value is approximately 2.3.

On the other hand, in the optical fiber intended to be used for pressure detection, it is not needed to attain stable long-distance light transmission using a fiber having a long span of more than 1 km. For example, for a case where the pressure detecting optical fiber is applied to cylinder inner pressure measurement of an engine, the length of the optical fiber is 2 to 3 m at the longest. Therefore, it is easy to protect the wiring portion of the optical fiber by containing it in a proper supporting member. It may be possible to exchange only the optical fiber in the pressure detecting portion with a fiber applied in the present invention. Although some amount of optical power loss occurs in a junction portion of the optical fiber, the effect of the optical power loss on the pressure detection itself is practically negligible. Therefore, in the pressure detecting optical fiber in accordance with the present invention, the V-value is actively decreased to a small value in order to obtain a large change in the amount of light with a small bending deformation. For example, the V-value of 1.6 to 1.7 in the embodiment is 65 to 70% of the normalized cut-off frequency.

Although evaluation of optical power loss induced by deformation of an optical fiber is generally difficult depending on the shape of the optical fiber, the optical power loss when a uniform bend is applied to an optical fiber is given, for example, by Equation (32) in D. Marcuse, "Curvature loss formulation for optical fiber", J. Opt. Soc. Am., Vol.66, No.3, pp 216–220 (1976). When a characteristic relationship between normalized frequency (V-value) and the optical power loss is extracted based on this result, the relationship shown in FIG. 15 can be obtained approximately where a bending radius and a wavelength of the light source are given and the fundamental mode is taking into consideration. In FIG. 15, practical parameters are taken into consideration. Vc in the figure indicates the normalized cut-off frequency. It can be confirmed from the figure that the optical power loss against deformation (bending) of the optical fiber is small in the range using the communication optical fiber. The change in this range is nearly linear. A straight line showing the gradient of the curve in this range is also shown in the figure. What we can understand for the first time from this figure is that a departure from the extension of the characteristic (tangent in the figure) of the communication optical fiber appears when the ratio of V to $V_c$ becomes smaller than 90% and the optical power loss becomes large. The very optical fiber in this range is an optical fiber suitable for use in the pressure sensor in accordance with the present invention. In the optical fiber relating to the optical fiber pressure sensor in accordance with the present invention, the V-value is selected by setting its upper limit to 90%.

The cut-off wavelength of the optical fiber of FIG. 1 is derived using Equation (1) for wavelength (cut-off wavelength) corresponding to the normalized cut-off frequency of 2.4 to the fundamental mode, and the result is 0.55 µm. It can be understood from Equation (1) that the V-value is characterized by the core radius "a" and the specific refractive index difference $\Delta$ of the core and the clad, but actually the outline of the core radius is unclear. Therefore, in many cases the certainly measurable cut-off wavelength is employed as a parameter instead of the core radius. One example of optical fibers of the present invention has been shown as the first embodiment in accordance with the present invention. However, as the above typical parameters of the optical fibers having the equivalent characteristic in a practical use, the specific refractive index difference between core and clad of 0.15 to 0.25%, the cut-off wavelength of 0.5 to 0.7 µm etc. are used, for example. With respect to the half diameter of the core, compatibility with a general communication optical fiber should be taken into consideration. Because, if the difference of the half diameter of the core from that of the general communication optical fiber arises and it becomes large, the optical power loss becomes large. The optical power loss to bend becomes larger, as the specific refractive index difference is smaller and the cut-off wavelength is smaller from the central wavelength of the light source used. However, when the loss is excessively large, in some cases the optical fiber becomes difficult to use as the sensor because light easily leaks in the wiring portion of the optical fiber. The above typical values are an example of parameters which satisfy both the attainment of a sensitivity required for bending and a useability when the optical fiber is mounted on a comparatively narrow space such as an engine head gasket shown in FIG. 13. As for the V-value, the range of 1.0 to 2.0 in the basic structure of FIG. 1 corresponds to the typical value. It is not necessary to say that, depending on a use condition of the optical fiber, for example, in a case where strong bending need not be applied to the optical fiber wiring and light leakage from the external does not affect the measurement depending on the mounting condition, or the optical power loss is so large that it should be improved, the setting of the parameters may be adjusted within a wider range with the upper limit of $V/V_c = 90\%$.

Since the V-value depends on the wavelength of a light source used as shown in Equation (1), the V-value can be adjusted by changing the wavelength of the light source. However, in actuality, a useable light source is limited due to cost and size of the apparatus, and in addition to this it is generally difficult to vary the wavelength using a single light source. Therefore, it can be considered that the V-value is practically a typical parameter to specify a structure of an optical fiber under a given light source. The above embodiment is based on a condition of using a light source having a wavelength of 0.7 to 0.8 µm, in detail, a generalpurpose laser diode module or a light source module of such a kind which can be used by being combined with a low-cost light receiving element. Of course, it is easy to change the structure of the optical fiber for a light source having another wavelength by slightly changing the specific refractive index difference between core and clad. Difference between the pressure detecting optical fiber and the commonly used communication optical fiber is in the difference of the magnitude of change in the amount of transmitted light when the optical fiber is bent.

Figure 2:
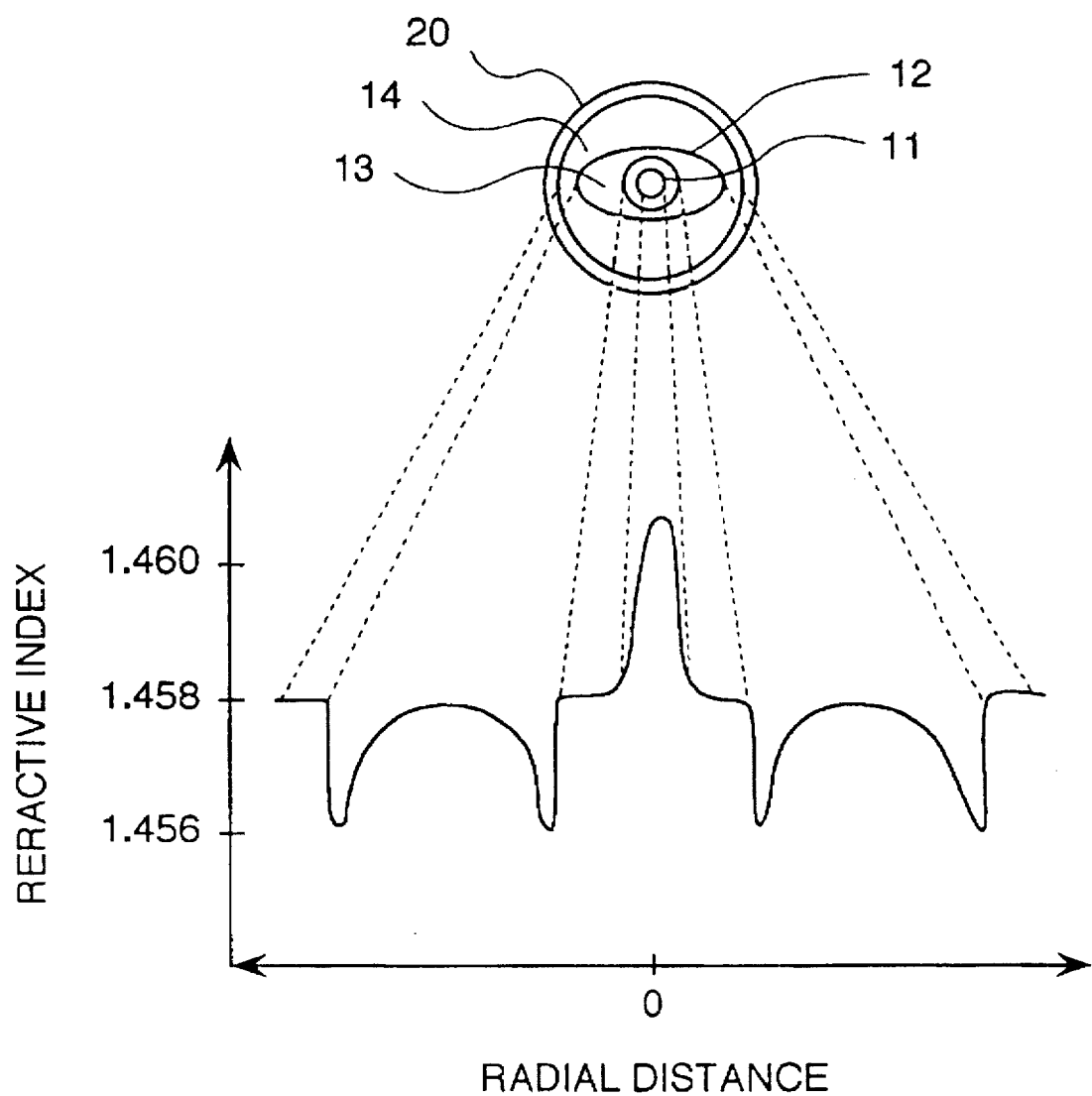
FIG. 2 is a cross-sectional view showing a second embodiment of an optical fiber in accordance with the present invention and an explanatory graph showing its refractive index distribution.

FIG. 2 shows a second embodiment of an optical fiber for detecting pressure based on an optical power loss induced by bending in accordance with the present invention. The pressure detecting optical fiber has a construction such that the wiring shape hardly affects its pressure detecting result. The different point from the first embodiment is that an oval jacket structure 13 is provided outside the clad 12. The jacket structure can be manufactured by adjusting an additive material to add to the glass fiber. Since the jacket structure 13 has a different thermal expansion from that of the surrounding material, strain remains inside the fiber during the manufacturing process of the optical fiber. There are two main effects: (1) a large change in the amount of transmitted light induced by an additional forced bending deformation can be easily obtained by pre-applying strain to the core and the clad portions, (2) a small deformation due to twisting during wiring is hardly applied since the preformed tension state inside the fiber is comparatively large. Thereby, in the pressure detecting optical fiber, the wiring portion of the optical fiber to the pressure detecting portion is minimally affected by strain and a large change in the amount of transmitted light is induced by the bending in the pressure detecting point. That is, the optical fiber pressure sensor can output a large and sensitive signal against disturbance by the function of the aforementioned item (1), and is hardly affected by the disturbance itself by the function of the aforementioned item (2).

The characteristic of the second embodiment of the present invention is the construction for applying strain provided around the core and the clad. Although in FIG. 2 the construction is composed of the jacket 13 and a support portion 14 for structurally supporting the jacket, the construction is not limited to the above. The outline of the jacket may be formed in a circular shape or the other construction may be added as far as the necessary strain effect can be obtained. However, it is necessary to select the construction in taking the ease of manufacturing and structural durability after manufacturing into consideration.

Here, the description will be made of the differences between the optical fiber in accordance with the present invention and the commonly well-known polarized plane conservation optical fiber of an oval jacket type. The structural difference is the construction of the core and the clad as described above. In the optical fiber in accordance with the present invention, the specific refractive index difference is set to a value in the range of 0.17 to 0.18%, which is smaller than that of the widely used communication optical fiber. The value to be set for the aforementioned V-value in the range proposed in the present invention is indispensable for the wavelength of a preferable light source. The difference in the effects is obvious from each history of development. That is, in the commonly used polarized plane conservation optical fiber of an oval jacket type, transmitting states of two independent polarized modes are controlled by inner anisotropic strain. On the other hand, the present invention attempts to obtain a stable and highsensitive transmitting light change by partial bending of the optical fiber.

Figure 3:
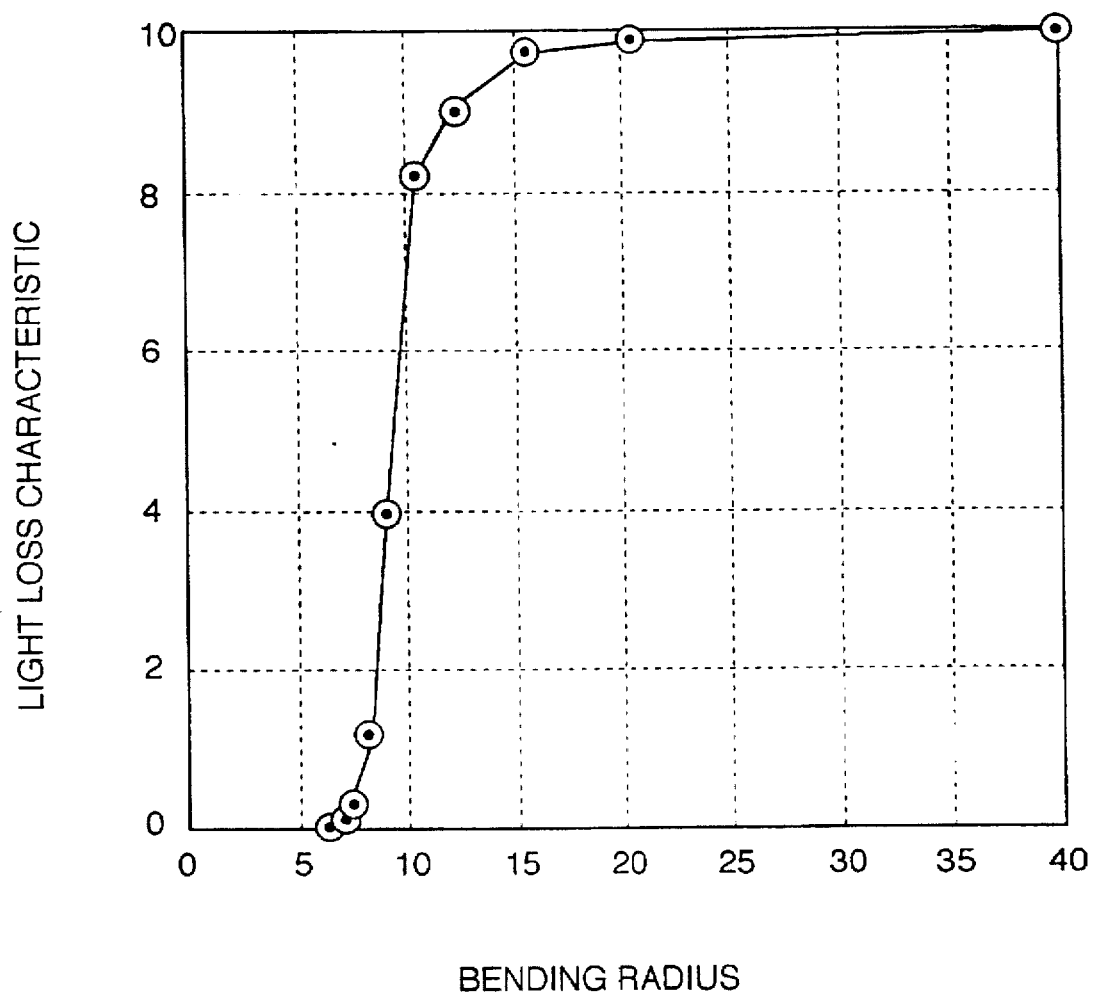
FIG. 3 is a graph showing optical power loss characteristic versus bending radius for the first and the second embodiment in accordance with the present invention.
Figure 16:
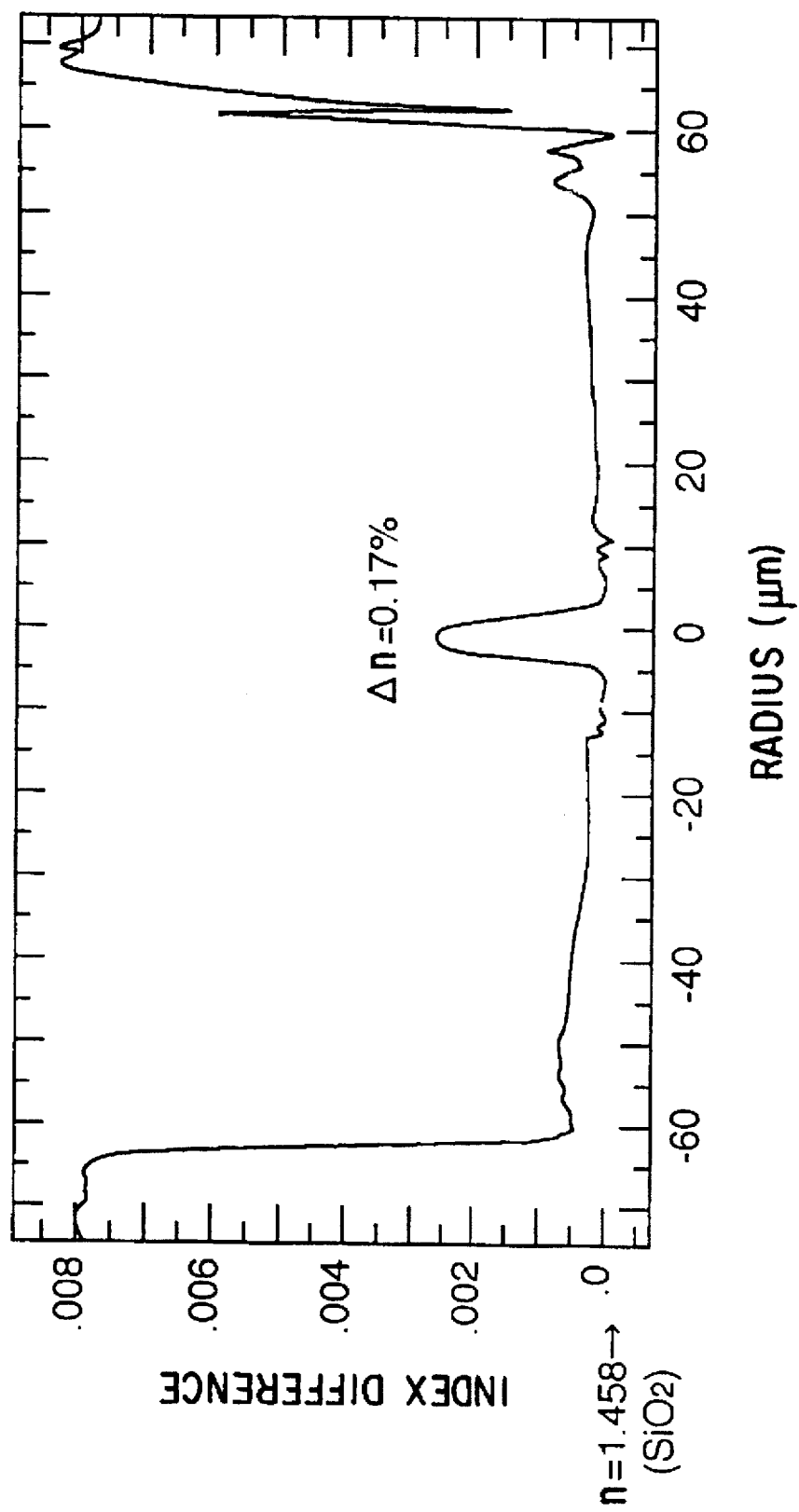
FIG. 16 is a measured example of a cross-sectional profile of a prototype of an optical fiber in accordance with the present invention.

FIG. 3 is a graph showing a measured result of the magnitude of transmitting light change (ordinate) versus partial bending (abscissa) for the pressure detecting optical fibers manufactured based on the first and the second embodiments in accordance with the present invention. FIG. 16 shows a crosssectional profile of a prototype of an optical fiber. It can be observed that there is no large change in the amount of light during a large bending radius, but there occurs a rapid and large change in the amount of light at a somewhat small radius. However, the bend is not so severe that the optical fiber breaks. The bending radius appearing light change is approximately 1 cm. Therefore, by pre-applying bending of approximately 1 cm to the pressure receiving portion of the optical fiber, sensitive pressure detection can be performed at the pressure detecting portion with almost no loss of light in the wiring portion. It is possible from FIG. 3 to confirm the range where the amount of light changes linearly. In the communication optical fiber, it is difficult to obtain a change in the amount of light as large as 70 to 80% of the initial amount of transmitting light unless a severe bending deformation is applied to the optical fiber. Actually, the communication optical fiber is not suitable to repeat bending since it is often broken. On the other hand, in the optical fiber in accordance with the present invention, it is possible to perform a large repeating and stable light change reaching nearly zero. In a case where a pressure detecting optical fiber is used for a long period of time, the burden applied to the optical fiber is smaller when the bending during operation is milder. In such a case, the same effect may be obtained by setting the V-value small and the bending radius large.

Figure 4:
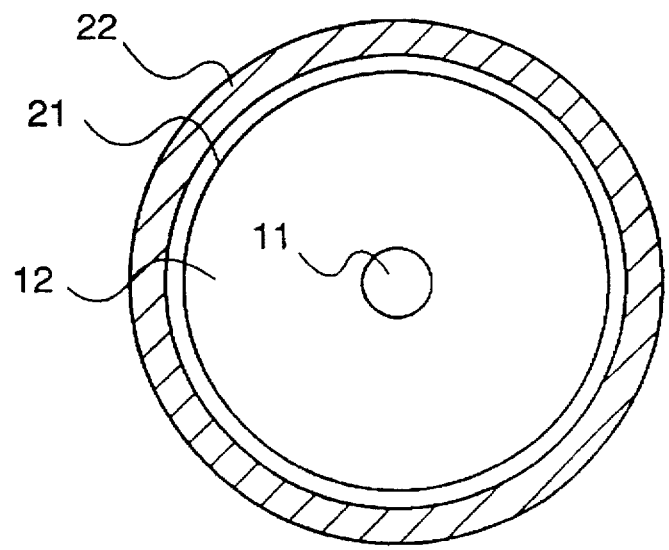
FIG. 4 is a cross-sectional view showing a third embodiment of an optical fiber and its protective coat in accordance with the present invention.

FIG. 4 shows a third embodiment of an optical fiber and its protective coat in accordance with the present invention. The optical fiber additionally has a heat resistant protective coat. The figure is a cross-sectional view of the optical fiber. The reference character 22 of FIG. 4 is the protective coat made of a polyimide resin having a heat resistivity of approximately 250° C., and the reference character 21 is a stress modulating layer provided between the protective coat and the main portion of the optical fiber. The construction of the core 11 and the clad 12 of the optical fiber is the same as in the first embodiment of the present invention. There are many kinds of polyimide resins, for example, different types of water-proof characteristics depending on the difference in the resin structure. These kinds may be selected depending on their purpose of use. It is not necessary to say that the construction of the main portion of the optical fiber is not limited to that of the present embodiment. The stress modulating layer may be constructed by depositing, for example, carbon fine particles or carbon materials to form a layer. When a comparatively hard resin such as polyimide resin is applied and thermo-set by heat treatment to form a protective coat, it is considered that large residual stress remains in the main portion of the optical fiber. However, the effect can be modulated by providing the stress modulating layer. In the combination of the polyimide resin and the carbon coat, the same effect can be attained with maintaining the heat resistivity of the whole optical fiber since the carbon itself is heat resistant. Thereby, the optical fibers according to the first and the second embodiments can be stably used in a high temperature environment. Particularly, it is possible to provide a pressure detecting optical fiber directly mounted on an engine. It goes without saying that the stress modulating layer may be eliminated depending on the situation. For example, in a case where the thickness of the protective coat 22 can be adjusted in order to reduce the strain, manufacturing of the optical fiber can be simplified by eliminating the stress 24 modulating layer. By omitting the stress absorbing layer 21, close contacting of the main part of the optical fiber with the coat is obtained too.

Figure 5:
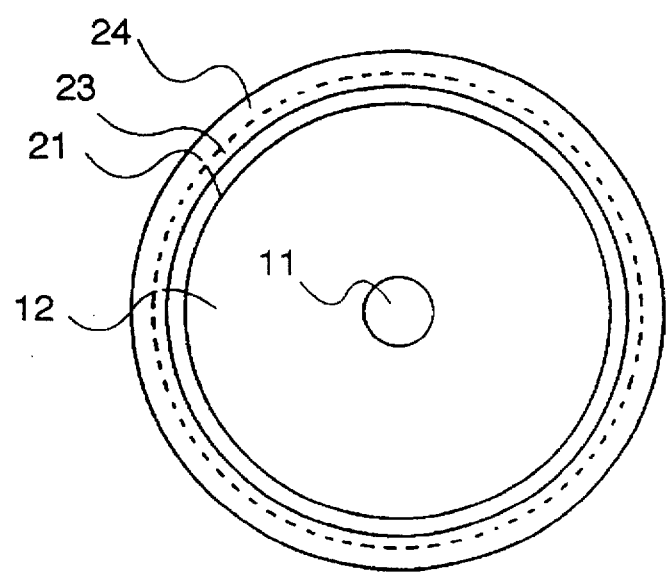
FIG. 5 is a cross-sectional view showing a fourth embodiment of an optical fiber and its protective coat in accordance with the present invention.

FIG. 5 shows a fourth embodiment of an optical fiber in accordance with the present invention in which plural kinds of metals are laminated, instead of the protective coat 22 in the third embodiment. An inner layer 23 of FIG. 5 is a vapordeposited layer of a mixture of, for example, nickel, chromium and gold, and an outer layer 24 is a gold coat laminated on the inner layer through plating or the like. In this case, the inner layer is an auxiliary layer for increased adhesiveness with the optical fiber, and the outer metallic layer actually serves as the protective coat. In this embodiment, the stress modulating layer 21 may be additionally provided. The pressure detecting optical fiber having the metallic coat has a higher heat resistivity and water-proof capability than the third embodiment of the present invention. Further, the optical fiber can be easily fixed when mounted through welding between metals.

Figure 6:
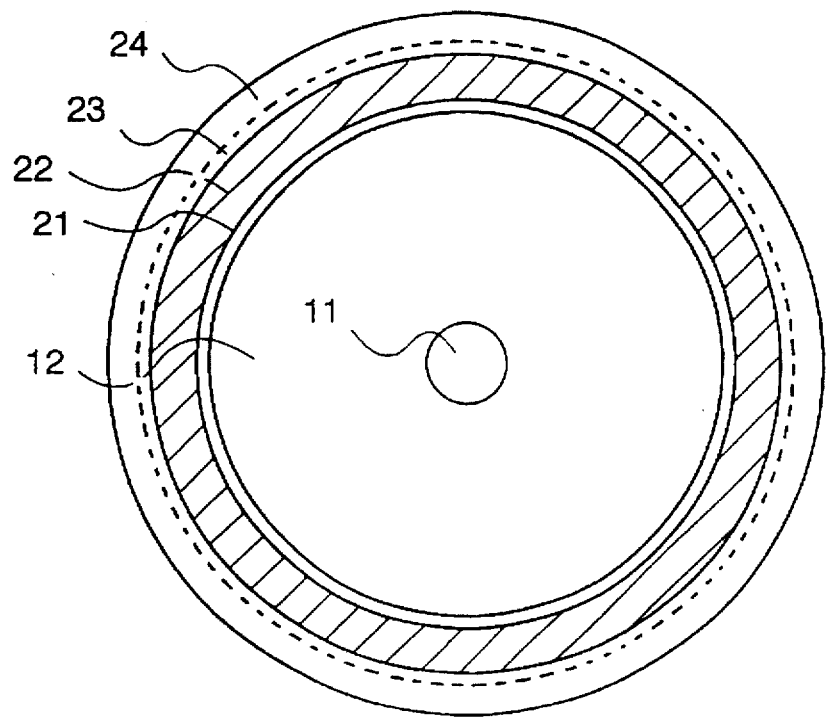
FIG. 6 is a cross-sectional view showing a fifth embodiment of an optical fiber and its protective coat in accordance with the present invention.

FIG. 6 shows a fifth embodiment of an optical fiber in accordance with the present invention in which the characteristics of the optical fibers in the third and the fourth embodiments are combined. The reference character 22 of FIG. 6 is a protective coat of a resin layer, the reference character 24 is an outer, metallic layer and the reference character 23 is an inner, auxiliary layer for increasing the adhesiveness of the metallic layer. In this embodiment, the resin layer having a necessary thickness is used for protecting the optical fiber, and the thin metallic layer is used for metal-to-metal fixing of the optical fiber or for protecting the resin layer without water-proof capability. This embodiment is an example of a combination of coats depending on each function. Although laminating of a metallic layer generally takes a longer time than laminating of a resin layer, in this embodiment the thickness of the inner layer 23 is reduced by using the resin layer 22 to protect the optical fiber. That is, the same effect as the optical fiber can be attained by sharing the serving functions. Here, numeral 21 is a stress modulating layer.

Figure 7:
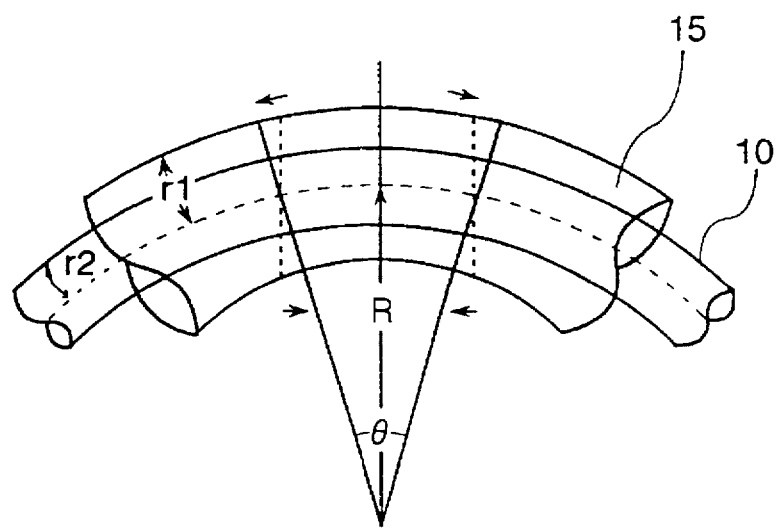
FIG. 7 is a view showing a sixth embodiment of an optical fiber in accordance with the present invention and explaining a setting method of its outer diameter.
Figure 17:
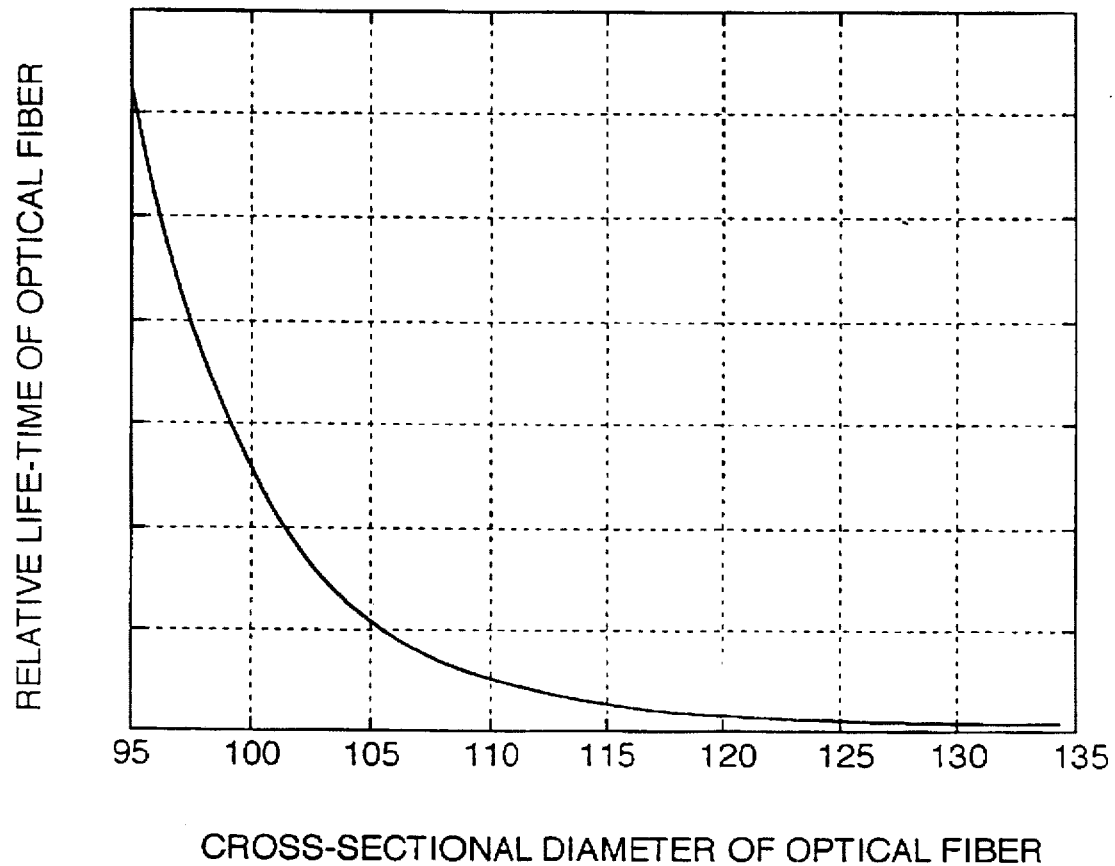
FIG. 17 is an explanatory graph showing the relationship between cross-sectional diameter of an optical fiber and its life-time.

FIG. 7 shows a sixth embodiment of an optical fiber in accordance with the present invention. In this embodiment, the outer diameter of a pressure detecting optical fiber 10 is smaller than the outer diameter of a common communication optical fiber 15. In detail, the outer diameter of the common communication optical fiber 15 is 125 μm, and on the other hand the outer diameter of the pressure detecting optical fiber 10 of the present embodiment is 90 to 110 μm. As shown in FIG. 7, the strain produced on the surface of an optical fiber is smaller in the optical fiber having a smaller outer diameter for the same bending radius. Therefore, when an optical fiber having a smaller outer diameter is used for a pressure sensor in which the change in an amount of light induced by partial bending of the optical fiber is detected, the mechanical burden applied to the optical fiber is reduced and the durability can be improved. Although the life-time of an optical fiber depends on various conditions such as the charateristics of the optical fiber itself, the environment of use and so on, FIG. 17 shows an example of a calculated evaluation result for the case of a condition giving a long life-time of ten years or more. It can be confirmed from the figure that durability can be easily improved by thinning the diameter of an optical fiber.

When the outer diameter of an optical fiber is reduced as shown in FIG. 7, the optical fiber is gradually apt to be twisted. Therefore, unnecessary strain is apt to be applied to the optical fiber depending on the wiring condition. In such a case, the effect can be reduced by using the optical fiber coat described in the third and the fourth embodiments in accordance with the present invention. The rigidity of the whole optical fiber is increased and, accordingly, occurrence of unnecessary deformation such as twisting can be suppressed by selecting the thickness of the comparatively hard polyimide coat as a resin to a proper thickness in the former case, and by selecting the thickness of the metallic coat to a proper thickness in the latter case. Of course, in order to increase the effect, it is possible to additionally use the "structure for applying distortion to the core and the clad portions" as in the second embodiment in accordance with the present invention.

Figure 8:
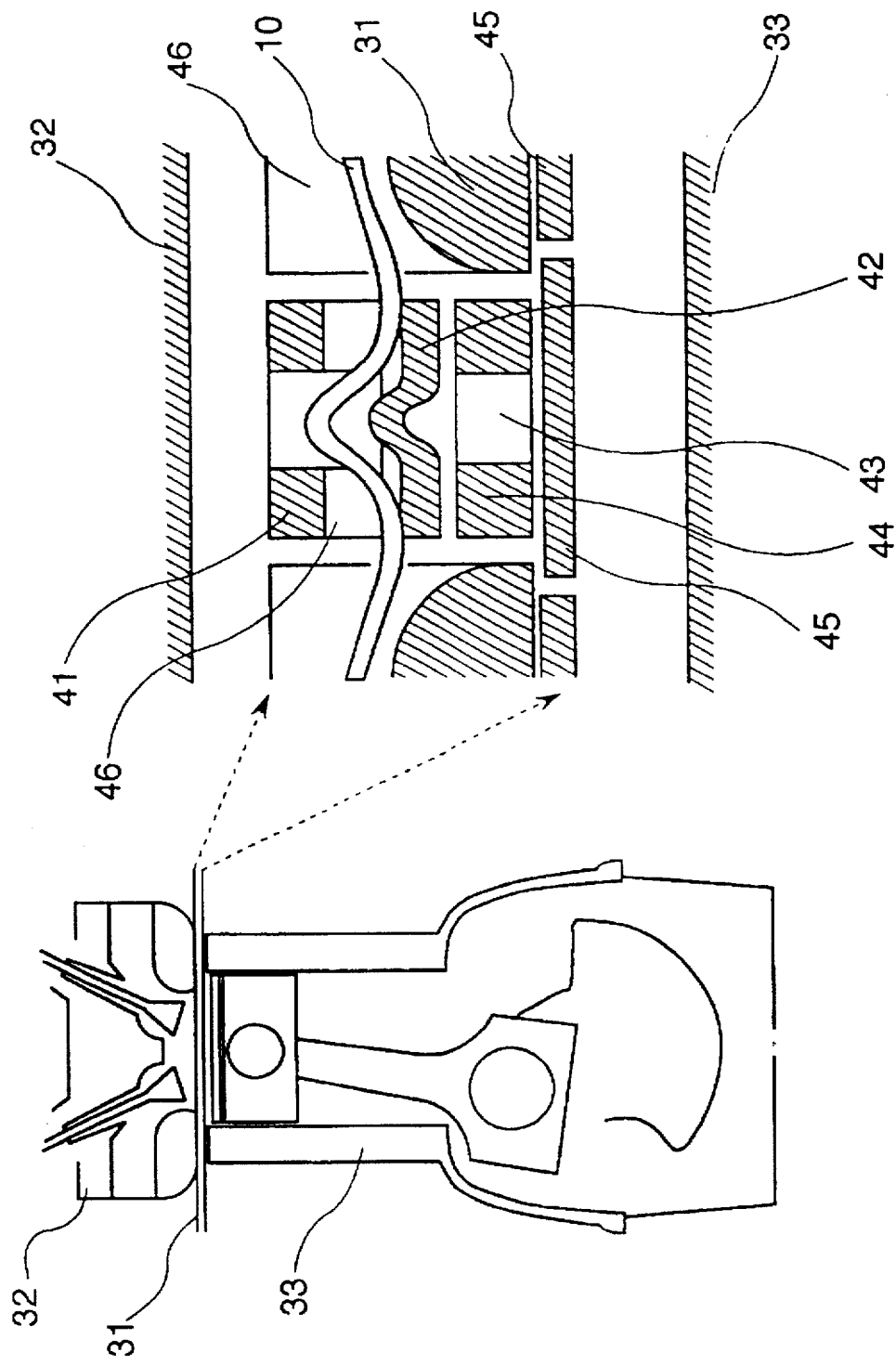
FIG. 8 is an explanatory view showing an example of mounting a seventh embodiment of an optical fiber pressure sensor in accordance with the present invention on an engine and its pressure receiving portion.

FIG. 8 shows a seventh embodiment in accordance with the present invention. In this embodiment, the pressure detecting optical fiber 10 in accordance with the present invention is mounted inside an engine head gasket 31 together with a pressure receiving structure. The pressure receiving structure in the embodiment of FIG. 8 is composed of a retaining plate 41 for supporting the optical fiber, a diaphragm plate 42 and a diaphragm retaining plate 44 having a pressure introducing hole 43. The optical fiber is guided so as to pass through grooves 46 provided in the retaining plate 41 and the gasket 31. In the portion where the bending deformation is applied to the optical fiber, for example, a fluoric lubricant of small volume change under high temperature may be additionally used. Since the head gasket 31 containing the pressure receiving portion and the optical fiber is attached between a cylinder head 32 and a cylinder block 33, pressure change inside the cylinder can be directly measured by conducting the pressure inside the combustion chamber to the pressure introducing hole 43. Since the optical fiber in accordance with the present invention can obtain a large change in the amount of light with a small bending deformation, a large output of the sensor can be obtained by applying a small bending deformation corresponding to the pressure change to only one portion. In this embodiment, pressure detection having a good signal-to-noise ratio can be performed with a small pressure receiving structure by using a special structural optical fiber even in an environment where mounting place for the sensor is difficult to find and there are many noise sources such as heating and vibration sources.

When the pressure detecting portion containing the optical fiber is mounted inside an engine structural member such as the head gasket as the supporting member, not only is the sensor itself easy to handle, but also the wiring portion of the optical fiber is protected from swinging and vibration. Therefore, pressure measurement can be stably performed. Especially, the gasket can provide a stable temperature environment.

Figure 9:
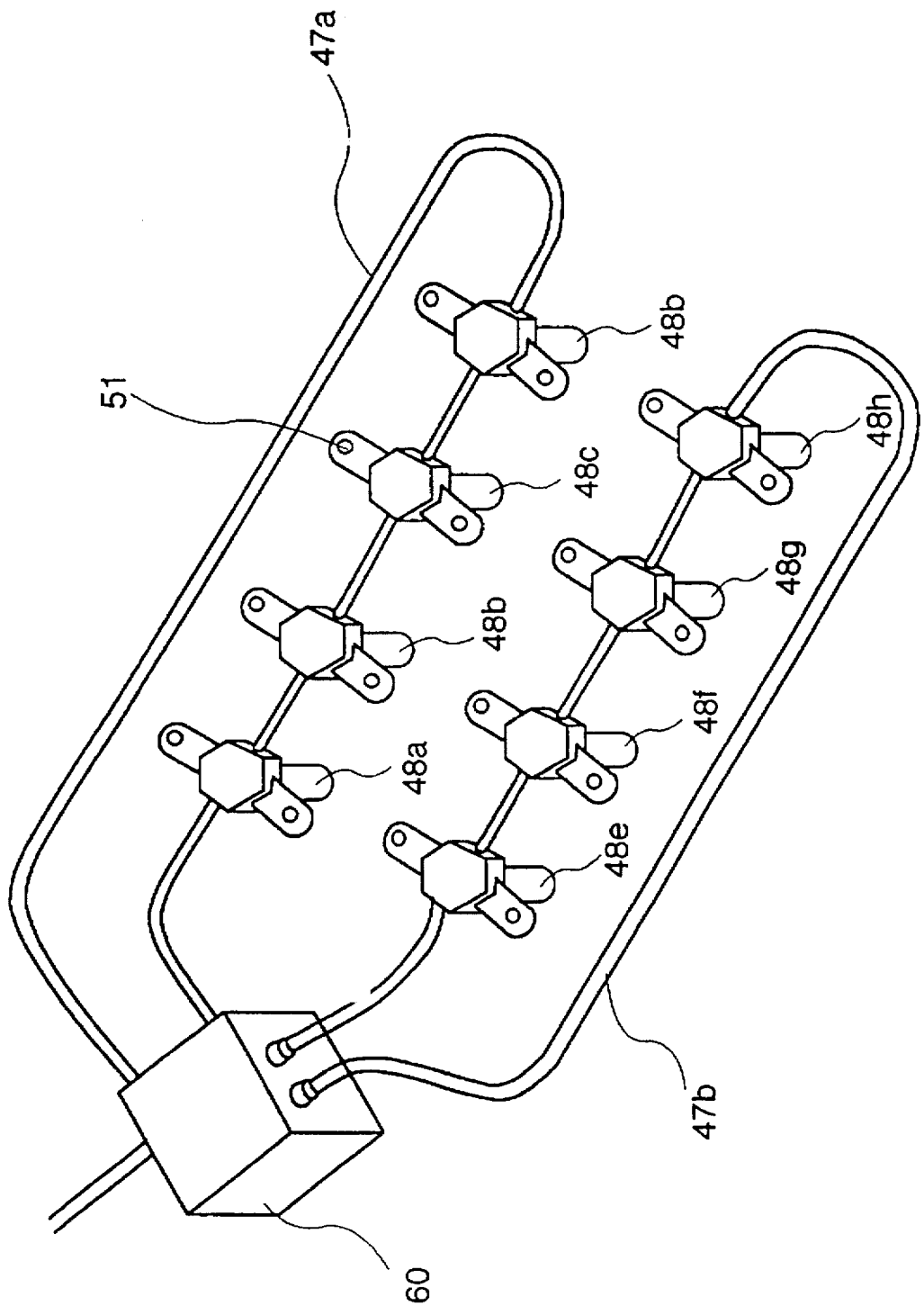
FIG. 9 is an explanatory view showing a supporting construction of an eighth embodiment of an optical fiber in accordance with the present invention.

Of course, the supporting member is not limited to a structural member of an engine. For example, a metal pipe may be used as a supporting member for a wiring portion of an optical fiber and a mounted pressure receiving portion is fixed so as to be connected to the metal pipe. As for such a mounting method, FIG. 9 shows an eighth embodiment of a mounting method in accordance with the present invention. In FIG. 9, metal pipes 47a, b connected to each of pressure receiving portions 48a–h are used as supporting members for the optical fiber. Inside the metal pipe, a shock absorbing material for moderating the vibration effect may be filled together with the optical fiber. The structure of each of the pressure receiving portions is fixed to a measuring position by a fixing means 51. A sealing means for preventing pressure leakage, such as an O-ring, may be used though it is not shown in detail in the figure. Of course, the shape of the pressure receiving portion may be generally selected according to the object in which the pressure is to be measured. In the pressure sensor utilizing the change in the amount of light induced by bending of an optical fiber, in general, mechanical swing and vibration can be reduced by mounting a portion, or the whole wiring, of the optical fiber inside a supporting member capable of keeping the optical fiber in a shape suitable for pressure measurement.

Figure 10:
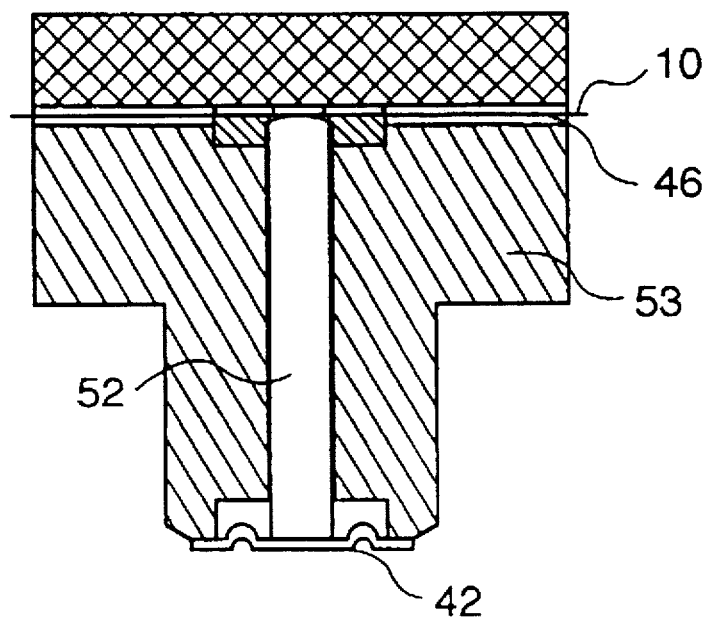
FIG. 10 is an explanatory view showing the construction of the eighth embodiment of a pressure receiving portion in accordance with the present invention.

FIG. 10 shows the construction of the eighth embodiment of the pressure receiving portion in accordance with the present invention. Displacement of a diaphragm plate 42 is converted into bending of the optical fiber through a pressure transmitting rod 52 connected to the diaphragm plate. In the construction of the pressure receiving portion, since the structure for applying bending to the optical fiber 10 and the diaphragm structure are independent from each other, the structure for applying bending to the optical fiber can be easily made small in size though the displacement of the diaphragm is large.

In the construction of the pressure receiving portion which applies bending to the optical fiber, having three supporting points as shown in FIG. 8 or in FIG. 10, since the mechanical structure can be formed in a small size while a local bend is stably applied to the optical fiber, it is easy to attain a high frequency response. In combustion pressure measurement of an engine, it is necessary to detect a knocking signal of 10 to 20 kHz. The frequency characteristic in the sensor of this type is determined by how fast the bending of the supported optical fiber can follow an alternating input. A required frequency response can be attained by setting the gap between the two points in the supporting side (retaining plates 41) of the pressure receiving portion to, for example, 4 mm or smaller. In the embodiment of FIG. 8, when the gap supporting the optical fiber is decreased, the diameter of the diaphragm also directly becomes small. However, the displacement of the diaphragm can be made large by increasing the diameter of the diaphragm in the direction perpendicular to the plane of the figure. In the embodiment of FIG. 10, since the supporting gap does not affect the effective size of the diaphragm as described above, it is easy to see that the frequency characteristic is compatible with the setting of the diaphragm displacement.

Figure 11A:
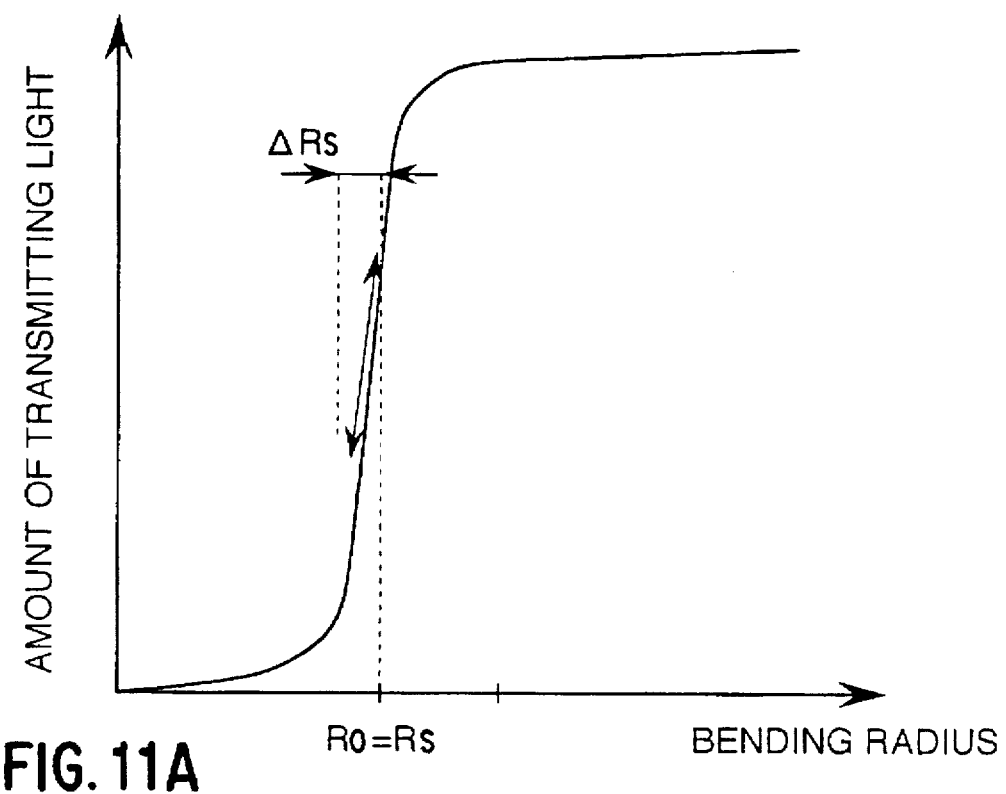
FIG. 11 is an explanatory graph showing the relationship between the setting of a bending radius of a optical fiber pressure sensor and its sensor output characteristic.
Figure 11B:
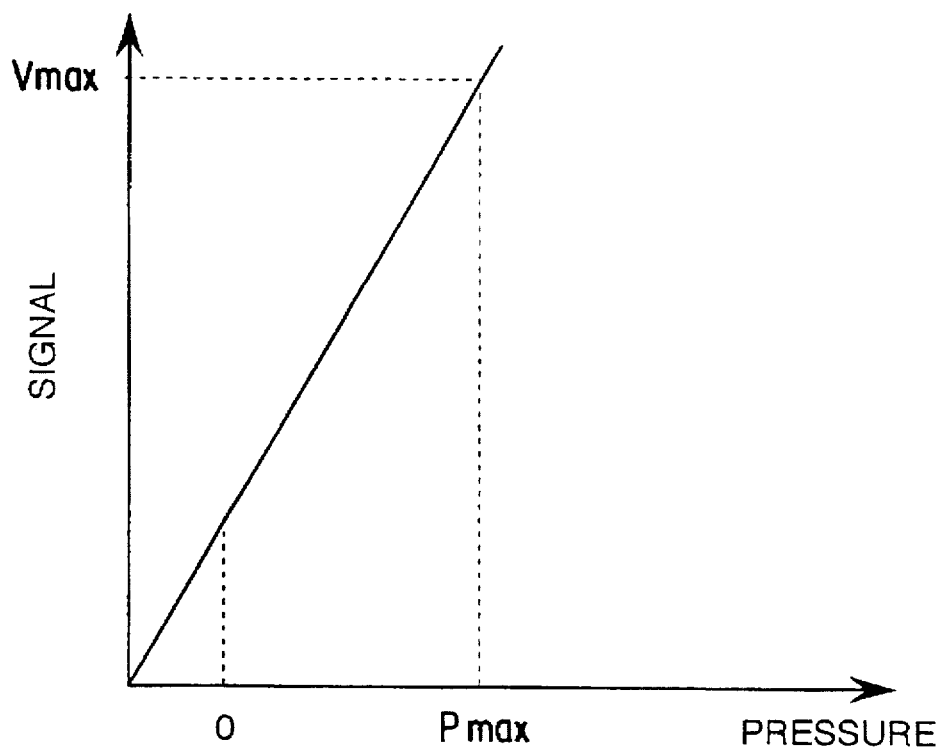

FIG. 11 shows the relationship between the bending radius of the optical fiber and the change in the amount of transmitted light through the optical fiber in the construction of the pressure receiving portion in the eighth and the tenth embodiments in accordance with the present invention. Bending corresponding to Rs of FIG. 11 is applied to the optical fiber between the retaining plates 41 and the diaphragm plate 41 of FIG. 8. The point Ro of FIG. 11 is a bending radius where the amount of transmitted light changes by 50%. In the pressure sensor utilizing the change in the amount of light induced by bending of an optical fiber, the operating point is selected so that Rs=Ro as shown in FIG. 11, and the operating rage ΔRs is set so as to come within the linear range of the change in the amount of light. By doing so, pressure change can be measured linearly over the entire range. In this case, the relationship between the applied pressure and the sensor output becomes linear as shown in FIG. 11. The figure shows that the decreasing of the light value is effected by the increasing of the output voltage. The value of Rs can be adjusted, for example, by varying the height of the projection of the diaphragm in the case of the pressure receiving portion of FIG. 8, and the ΔRs can be adjusted by varying the displacement of the diaphragm.

Figure 12A:
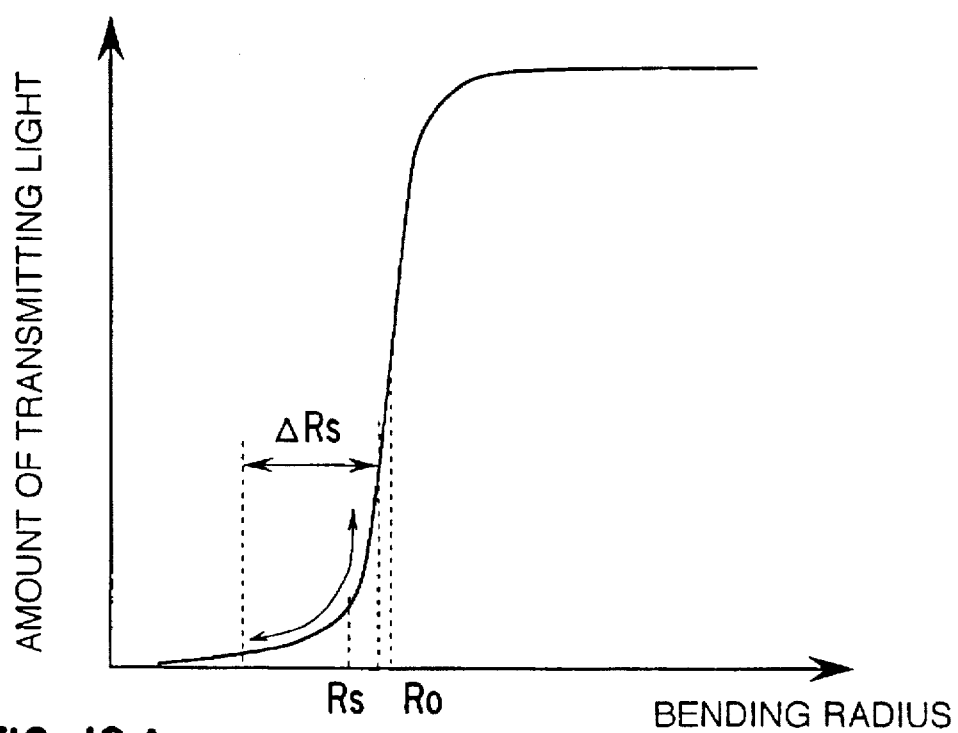
FIG. 12 is an explanatory graph showing the relationship between the setting of a bending radius and sensor output characteristic of a ninth embodiment of an optical fiber pressure sensor in accordance with the present invention.
Figure 12B:
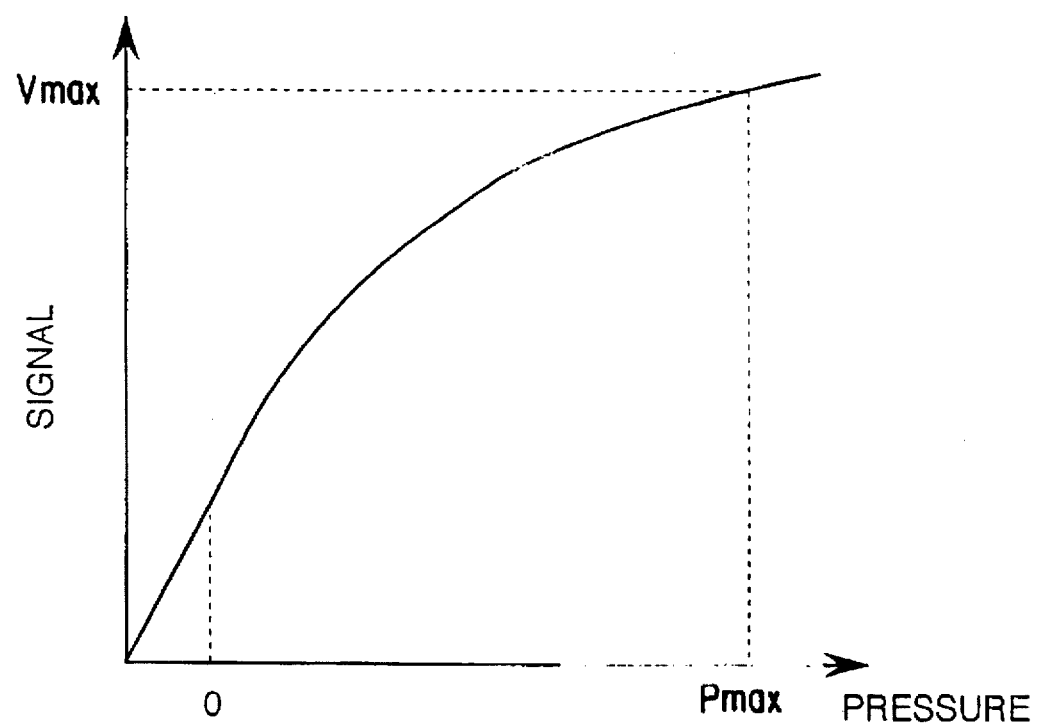

FIG. 12 shows the relationship between applied pressure and output of a ninth embodiment of a pressure sensor in accordance with the present invention. The pressure sensor has an optical fiber in accordance with the present invention. In this embodiment, an initial bending radius Rs applied to the optical fiber of the pressure receiving portion is set to a point where Rs<Ro and the operating range ΔRs of the sensor in the side of the small bending radius falls in the nonlinear region of the change in the amount of transmitted light. In this case, the relationship of the sensor output to an input pressure is linear for a low pressure and is saturated for a high pressure, as shown in FIG. 12. Therefore, accurate measuring of a negative pressure of nearly minus one atmospheric pressure observed, for example, in the fuel intake stroke of an engine, can be compatible with wide dynamic range measurement of combustion pressure of several tens of atmospheric pressure in the combustion stroke of the engine. That is, a wide range of pressure change can be detected within a voltage range required for signal processing of an A/D converter, and at the same time pressure change in a low pressure can be accurately detected in the linear response region. In the embodiment, the bending required during the use of an optical fiber is shifted to the comparatively severe direction. Therefore, when the common communication optical fiber is used, the optical fiber may be broken or the life-time of the optical fiber may be shortened if not broken. However, the pressure detecting optical fiber of the present invention has its construction of the main portion of the fiber adjusted so as to produce a large change in the amount of light by a small bending. Therefore, such a problem can be avoided. In addition to this, the specific refractive index difference of the core and the clad is decreased to a value smaller than that in the first and the second embodiments, and the cut-off wavelength of the optical fiber is selected further smaller than the wavelength of the light source used. By doing so, the necessary change in the amount of light may be obtained by a larger bending radius than that, for example, in the case of FIG. 3. In any cases, since the bending radius in an operating range of a sensor can be increased, the bending burden on the optical fiber can be reduced. Therefore, by combining the optical fiber in accordance with the present invention, the bending condition of the optical fiber of FIG. 12 can be made practical.

Figure 13:
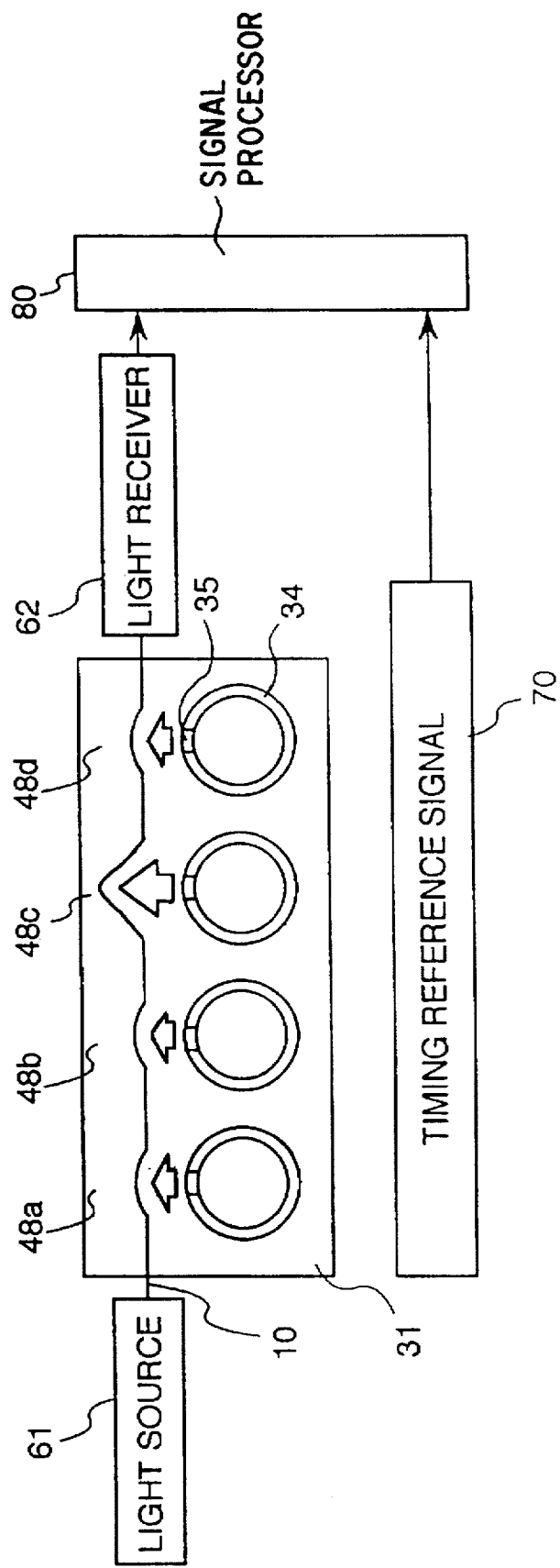
FIG. 13 is an explanatory view showing a multi-cylinder inner pressure measuring system for an engine using a tenth embodiment of a pressure sensor optical fiber in accordance with the present invention.

FIG. 13 is a conceptual view showing the construction in which a multi-cylinder inner pressure measuring system for an engine using a tenth embodiment of a pressure detecting optical fiber in accordance with the present invention. The pressure detecting optical fiber 10 is mounted in a head gasket 31. Each of the pressure receiving positions 53a, b, c, d may employ the construction shown in FIG. 8. Combustion pressure is conducted to each of the pressure receiving portions through pressure introducing grooves 35 provided in a cylinder bore grommet 34. In the present embodiment, by using an optical fiber showing a large change in the amount of light for a partial bending, it is possible to obtain a sensor which has a high frequency response, small size, high signal-to-noise ratio and large output. This is particularly important for measuring pressure in plural cylinders.

Figure 14A:
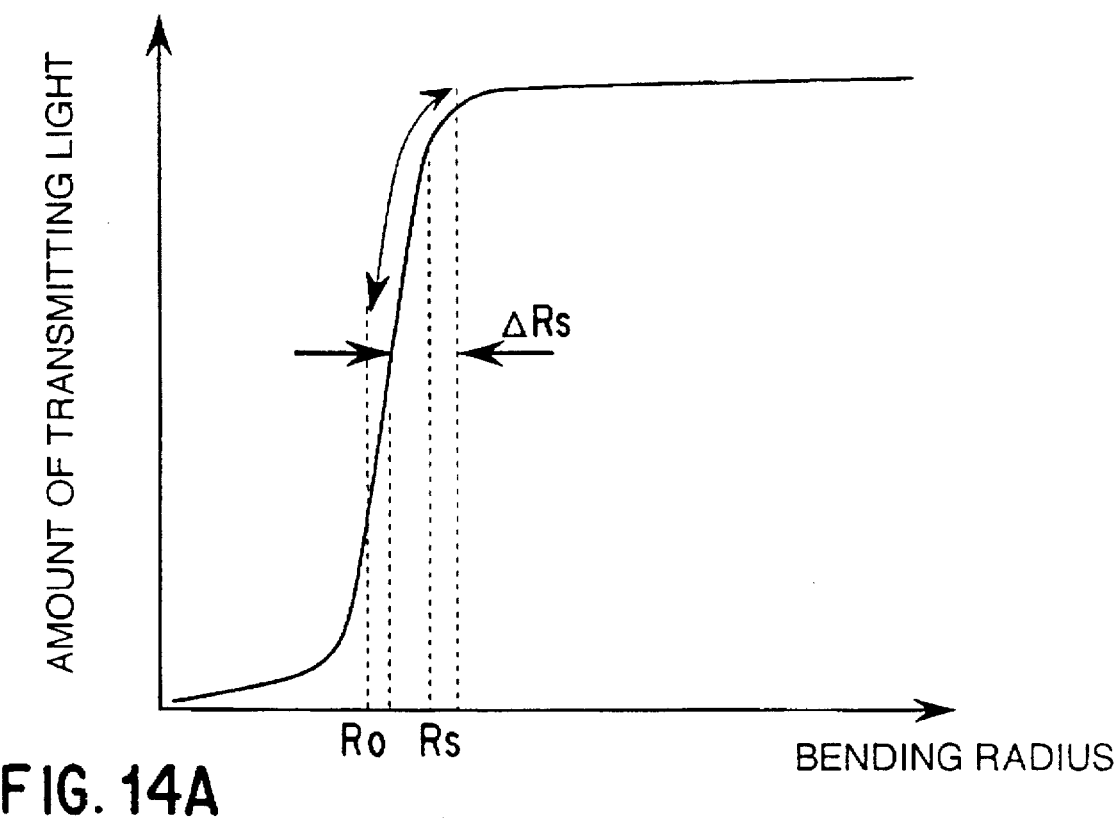
FIG. 14 is an explanatory graph showing the relationship between the setting of a bending radius and sensor output characteristic of an eleventh embodiment of an optical fiber pressure sensor in accordance with the present invention.
Figure 14B:
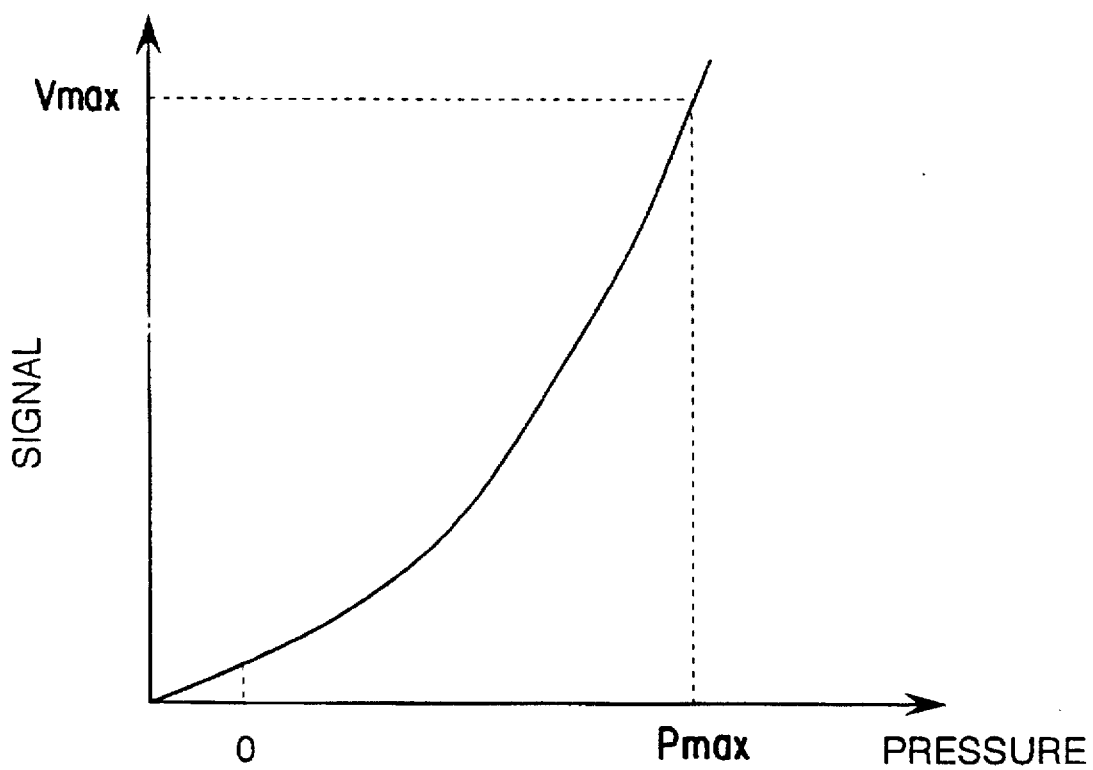

FIG. 14 shows the relationship between applied pressure and output of an eleventh embodiment of a pressure sensor in accordance with the present invention. The pressure sensor has an optical fiber in accordance with the present invention. In this embodiment, an initial bending radius Rs applied to the optical fiber of the pressure receiving portion is set to a point where Rs>Ro, and the operating range ΔRs of the sensor in the side of the large bending radius falls in the nonlinear region of the change in the amount of transmitted light. In this case, the relationship of the sensor output to the input pressure is linear for a high pressure and the operating range of the optical fiber is totally shifted to the milder bending direction, as shown in FIG. 14. Thereby, for example, in the construction of FIG. 13, the mechanical burden placed on the optical fiber can be reduced while the change in combustion pressure in an engine can be accurately measured. Therefore, in general, stable and accurate pressure measurement can be expected for a long time. This embodiment is complex in construction, for example, using the optical fiber of FIG. 2, and is slightly low in mechanical strength, but suitable for using the optical fiber capable of obtaining proper sensitivity as a pressure sensor stably and for a long time. In the optical fiber in accordance with the present invention, there is no need to bend the optical fiber too severe to be broken. Therefore, it is easy to change the setting condition of bending of the optical fiber depending on the situation.

Application of the optical fiber in accordance with the present invention has been mainly described on pressure measurement in a cylinder of a vehicle engine. However, application of the pressure detecting optical fiber in accordance with the present invention is not limited to the above application example. Improving mounting ability by reducing size of the mechanical construction of the pressure receiving portion, attaining a high frequency response capability at the same time, and extending the life-time by reducing the bending deformation required for the optical fiber are essential problems of a pressure sensor for detecting change in an amount of light induced by bending of the optical fiber. These are common problems regardless of the application. In the present invention, these problems are solved by mainly changing the construction of the optical fiber itself.

According to the present invention, since a large change in light intensity can be obtained by a small amount of bending of an optical fiber in a pressure measurement using the optical fiber, accuracy of the pressure sensor can be improved.

What is claimed is:

1. An optical fiber pressure sensor for measuring a pressure on the basis of an optical power loss depending on a configuration change of an optical fiber comprising a luminescence means optically connected with at least an optical fiber which is constructed with a main part for propagating a light and a protective coating member for protecting said main part, a light intercepting means for detecting a light passing through the optical fiber or a reflected light from the optical fiber and a bending means for bending at least a part of the optical fiber according to a measured pressure, wherein said optical fiber pressure sensor has a normalization frequency V value of said optical fiber smaller than 90% of a normalization cut-off frequency defining a single transmission mode condition of said optical fiber.

2. An optical fiber pressure sensor as defined in claim 1, wherein said main part of said optical fiber comprises a core having a refractive index which is almost uniform, said core being a part in which said light is shut and is propagated, and a clad arranged outside of said core, and wherein said normalization frequency V value is in a range from 1.0 to 2.0.

3. An optical fiber pressure sensor as defined in claim 1, wherein said main part of said optical fiber comprises a core having a refractive index which is almost uniform, said core being a part in which said light is shut and is propagated, and a clad arranged outside of said core, and wherein a difference of a ratio of said refractive index of said core and said clad is in a range from 0.15% to 0.25%, or a cutoff wave length of said optical fiber having said core and said clad is in a range from 0.5 μm to 0.7 μm.

4. An optical fiber pressure sensor as defined in claim 1, wherein said main part of said optical fiber has a construction which distorts an inside of said main part beforehand.

5. An optical fiber pressure sensor as defined claim 4, wherein said construction to distort includes a jacket construction outside of said core and said clad, and a support construction which maintains said jacket construction and forms said optical fiber.

6. An optical fiber pressure sensor according to claim 1, wherein said protective coating member is provided with Polyimide resin.

7. An optical fiber pressure sensor according to claim 1, wherein said protective coating member is a metal layer laminated with more than one kind of metal.

8. An optical fiber pressure sensor according to claim 1, wherein said protective coating member is provided with Polyimide resin and a metal layer thereon laminated with more than one kind of metal.

9. An optical fiber pressure sensor according to claim 1, wherein a diameter of an external thread of said main part except said protective coating member is smaller than 125 μm.

10. An optical fiber pressure sensor according to claim 1, wherein a stress damping layer is provided between said protective coating member and said main part of said optical fiber.

11. An optical fiber pressure sensor as defined in claim 10, wherein said stress damping layer is constructed with a carbon material which is laminated on said main part.

12. An optical fiber pressure sensor as defined in claim 11, wherein said bending means is constructed with a pushing means for pushing a part of the optical fiber between two other parts for supporting the optical fiber.

13. An optical fiber pressure sensor as defined claim 12, wherein said optical fiber pressure sensor further comprises, a support member which specifies a wiring configuration of at least a part of the optical fiber.

14. An optical fiber pressure sensor as defined claim 13, wherein said support member is constructed with a head gasket, a bolt and an ignition plug.

15. An optical fiber pressure sensor as defined in claim 11, wherein said bending means provides a loose bending in a curve for the amount of the transmitted light through said optical fiber at an early setting stage than that in a central part of the curve which decreases linearly, and wherein an operating range of the sensor is in a non-linear range of the amount of the transmitted light, whereby high pressure works in the linear range, and low pressure works in a strong range, of the non-linearity of the curve by previously providing a bending deformation to the optical fiber.

16. An optical fiber pressure sensor as defined in claim 11, wherein said bending means provides a strict bending in a curve of the amount of the transmitted light through said optical fiber at an early setting stage than that in a central part of the curve decreasing linearly, and an operating range of the sensor is in a non-linear range of the amount of the transmitted light, thereby low pressure works in the linear range and high pressure works in a strong range of the non-linearity of the curve by previously providing a bending deformation to the optical fiber.

* * * * *